United States Patent
Sekiyama et al.

(10) Patent No.: US 8,510,036 B2
(45) Date of Patent: Aug. 13, 2013

(54) INFORMATION PROVIDING DEVICE AND INFORMATION PROVIDING SYSTEM

(75) Inventors: Hiroaki Sekiyama, Tokyo (JP); Shinji Sugiyama, Tokyo (JP); Keiko Katsukawa, Tokyo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 151 days.

(21) Appl. No.: 13/001,705

(22) PCT Filed: Aug. 4, 2009

(86) PCT No.: PCT/JP2009/063790
§ 371 (c)(1),
(2), (4) Date: Mar. 8, 2011

(87) PCT Pub. No.: WO2011/016111
PCT Pub. Date: Feb. 10, 2011

(65) Prior Publication Data
US 2011/0166778 A1    Jul. 7, 2011

(51) Int. Cl.
*G06Q 30/00* (2012.01)
(52) U.S. Cl.
USPC ............ 701/424; 701/425; 701/426; 701/400
(58) Field of Classification Search
None
See application file for complete search history.

(56) References Cited

U.S. PATENT DOCUMENTS

| | | | | |
|---|---|---|---|---|
| 6,389,402 B1 * | 5/2002 | Ginter et al. | .................... | 705/51 |
| 6,427,140 B1 * | 7/2002 | Ginter et al. | .................... | 705/80 |
| 6,600,994 B1 * | 7/2003 | Polidi | .......................... | 701/533 |
| 7,058,506 B2 * | 6/2006 | Kawase et al. | ................ | 701/410 |
| 7,130,743 B2 * | 10/2006 | Kudo et al. | .................... | 701/424 |
| 7,233,861 B2 * | 6/2007 | Van Buer et al. | ............. | 701/424 |
| 7,254,481 B2 * | 8/2007 | Yamada et al. | ............... | 701/426 |
| 7,419,095 B2 * | 9/2008 | Yoshioka et al. | ............. | 235/384 |
| 7,536,258 B2 * | 5/2009 | Kudo et al. | .................... | 701/424 |
| 7,751,968 B2 * | 7/2010 | Yamada et al. | ............... | 701/426 |
| 7,792,637 B2 * | 9/2010 | Matsuura et al. | ............. | 701/408 |

(Continued)

FOREIGN PATENT DOCUMENTS

| | | |
|---|---|---|
| EP | 1359519 A2 | 11/2003 |
| JP | 2002048568 A | 2/2002 |

(Continued)

OTHER PUBLICATIONS

International Preliminary Report on Patentability issued Mar. 13, 2012 in International Application No. PCT/JP2009/063790.

*Primary Examiner* — Thomas Tarcza
*Assistant Examiner* — Richard Goldman
(74) *Attorney, Agent, or Firm* — Gifford, Krass, Sprinkle, Anderson & Citkowski, P.C.

(57) ABSTRACT

The invention provides an information providing device and an information providing system which can provide suitable destination information according to the utilization situation of a user. The information providing device is an information providing device mounted on a vehicle and provides information on potential destinations. An information providing unit which provides information on a potential destination in accordance with the performance of electronic payment at a destination after traveling assistance is provided. By providing this information on a potential destination, a potential destination can be selected on the basis of information on a destination for which traveling assistance has actually been provided and which has been utilized, information on the potential destination can be provided, and information on a suitable potential destination according to the actual utilization situation of a user can be provided.

1 Claim, 5 Drawing Sheets

(56) References Cited

U.S. PATENT DOCUMENTS

| | | | |
|---|---|---|---|
| 7,869,942 B2 * | 1/2011 | Naito et al. | 701/424 |
| 7,991,548 B2 * | 8/2011 | Singh | 701/424 |
| 8,078,397 B1 * | 12/2011 | Zilka | 701/414 |
| 8,175,802 B2 * | 5/2012 | Forstall et al. | 701/424 |
| 8,185,439 B2 * | 5/2012 | Webb et al. | 705/16 |
| 8,204,676 B2 * | 6/2012 | Tanabe | 701/424 |
| 8,255,154 B2 * | 8/2012 | Zilka | 701/408 |
| 8,271,196 B2 * | 9/2012 | Jones | 701/533 |
| 2002/0161517 A1 * | 10/2002 | Yano et al. | 701/209 |
| 2003/0220981 A1 * | 11/2003 | Nakamura et al. | 709/217 |
| 2004/0102899 A1 * | 5/2004 | Kaji et al. | 701/210 |
| 2005/0182671 A1 | 8/2005 | Miyauchi | |
| 2006/0089792 A1 * | 4/2006 | Manber et al. | 701/207 |
| 2006/0149684 A1 * | 7/2006 | Matsuura et al. | 705/65 |
| 2006/0184313 A1 * | 8/2006 | Butler, Jr. | 701/200 |
| 2009/0048767 A1 * | 2/2009 | Vaughn | 701/117 |
| 2011/0047037 A1 * | 2/2011 | Wu | 705/17 |
| 2011/0118978 A1 * | 5/2011 | Li | 701/207 |
| 2011/0195726 A1 * | 8/2011 | Horvitz et al. | 455/456.3 |
| 2012/0158212 A1 * | 6/2012 | Ying et al. | 701/1 |
| 2012/0158289 A1 * | 6/2012 | Bernheim et al. | 701/425 |
| 2012/0161971 A1 * | 6/2012 | Nasir et al. | 340/573.4 |
| 2012/0233065 A1 * | 9/2012 | Wu | 705/39 |
| 2012/0265433 A1 * | 10/2012 | Viola et al. | 701/410 |

FOREIGN PATENT DOCUMENTS

| | | |
|---|---|---|
| JP | 2002140740 A | 5/2002 |
| JP | 2003323568 A | 11/2003 |
| JP | 2005267601 A | 9/2005 |
| JP | 3832770 B2 | 10/2006 |
| JP | 2008151531 A | 7/2008 |
| WO | WO-2005024688 A1 | 3/2005 |

* cited by examiner

INFORMATION PROVIDING DEVICE AND INFORMATION PROVIDING SYSTEM

CROSS REFERENCE TO RELATED APPLICATIONS

This application is the U.S. national phase of PCT/JP2009/063790filed Aug. 4, 2009, which is incorporated herein by reference.

TECHNICAL FIELD

The present invention relates to an information providing device and an information providing system which provides the destination information or the like of a vehicle.

BACKGROUND ART

Conventionally, as a system which provides the destination information or the like of a vehicle, for example, as shown in Japanese Unexamined Patent Application Publication No. 2008-151531, there is known a system which transmits destination information to a central device when routing assistance is ended normally by a vehicle navigation device, determines ranking at the time of destination search on the basis of the frequency of reception of the destination information, and presents the ranking information.

CITATION LIST

Patent Literature

Patent Literature 1: Japanese Unexamined Patent Application Publication No. 2008-151531

SUMMARY OF INVENTION

Technical Problem

However, such a system has a problem in that suitable destination information cannot be provided. For example, in a case where a destination is a store, a facility, or the like, there is a possibility that the store, facility, or the like which is a destination may not actually be utilized even if a driver intends to go to the destination according to the vehicle routing assistance. That is, even if the vehicle driver arrives at the destination, the driver may utilize a store other than the destination store without entering the destination store, or there may be cases where, due to the fact that there is no parking lot, the driver does not utilize the facility at the destination. In such a case, the destination information provided becomes information that does not correspond to the utilization of a user, and suitable destination information may not be provided.

Thus, the invention has been made in order to solve such a technical problem, and the object thereof is to provide an information providing device and an information providing system which can provide suitable destination information according to the utilization situation of a user.

Solution to Problem

That is, the information providing device related to the invention is an information providing device which is mounted on a vehicle and provides information on potential destinations in the vehicle. The information providing device includes an information providing unit which provides information on a potential destination in accordance with the performance of electronic payment at a destination after traveling assistance to the destination by a vehicle-mounted device.

According to this invention, by providing information on a potential destination in accordance with the performance of electronic payment at a destination after traveling assistance to the destination by a vehicle-mounted device, a potential destination can be selected on the basis of information on a destination for which traveling assistance has actually been provided and which has been utilized, and information on the potential destination can be provided. For this reason, information on a suitable potential destination according to the actual utilization situation of a user can be provided.

Additionally, in the information providing device related to the invention, it is preferable that the information providing unit preferentially provides information on a destination at which electronic payment has been performed with a higher frequency as the potential destination.

In this case, by preferentially providing information on a destination at which electronic payment has been performed with a higher frequency as the potential destination, information on a destination for which traveling assistance has actually been provided and which has been frequently utilized can be preferentially provided as the potential destination. For this reason, information on a potential destination can be suitably provided according to the utilization situation of a user.

Additionally, the information providing system related to the invention is an information providing system which provides information on potential destinations in a vehicle. The information providing system includes an electronic payment information acquisition unit which acquires information on electronic payment performed at a destination after traveling assistance to the destination by a vehicle-mounted device, and an information providing unit which provides information on a potential destination in accordance with the electronic payment information acquired by the electronic payment information acquisition unit.

According to this invention, by providing information on a potential destination in accordance with the performance of electronic payment at a destination after travel guide to the destination by a vehicle-mounted device, a potential destination can be selected on the basis of information on a destination which has actually been guided for travel and utilized, and information on the potential destination can be provided. For this reason, information on a suitable potential destination according to the actual utilization situation of a user can be provided.

Additionally, in the information providing system related to the invention, it is preferable that the information providing unit preferentially provides information on a destination at which electronic payment has been performed with a higher frequency as the potential destination.

According to this invention, by preferentially providing information on a destination at which electronic payment has been performed with a higher frequency as the potential destination, information on a destination for which traveling assistance has actually been provided and which has been frequently utilized can be preferentially provided as the potential destination. For this reason, information on a potential destination can be suitably provided according to the utilization situation of a user.

Advantageous Effects of Invention

According to the invention, by providing information on a potential destination in accordance with the performance of electronic payment at a destination after traveling assistance to the destination by a vehicle-mounted device, suitable destination information can be provided according to the utilization situation of a user.

DESCRIPTION OF EMBODIMENTS

Hereinafter, an embodiment of the invention will be described with reference to the accompanying drawings. In addition, in the description of the drawings, the same reference numerals will be given to the same elements, and duplicate description will be omitted.

Figure 1:
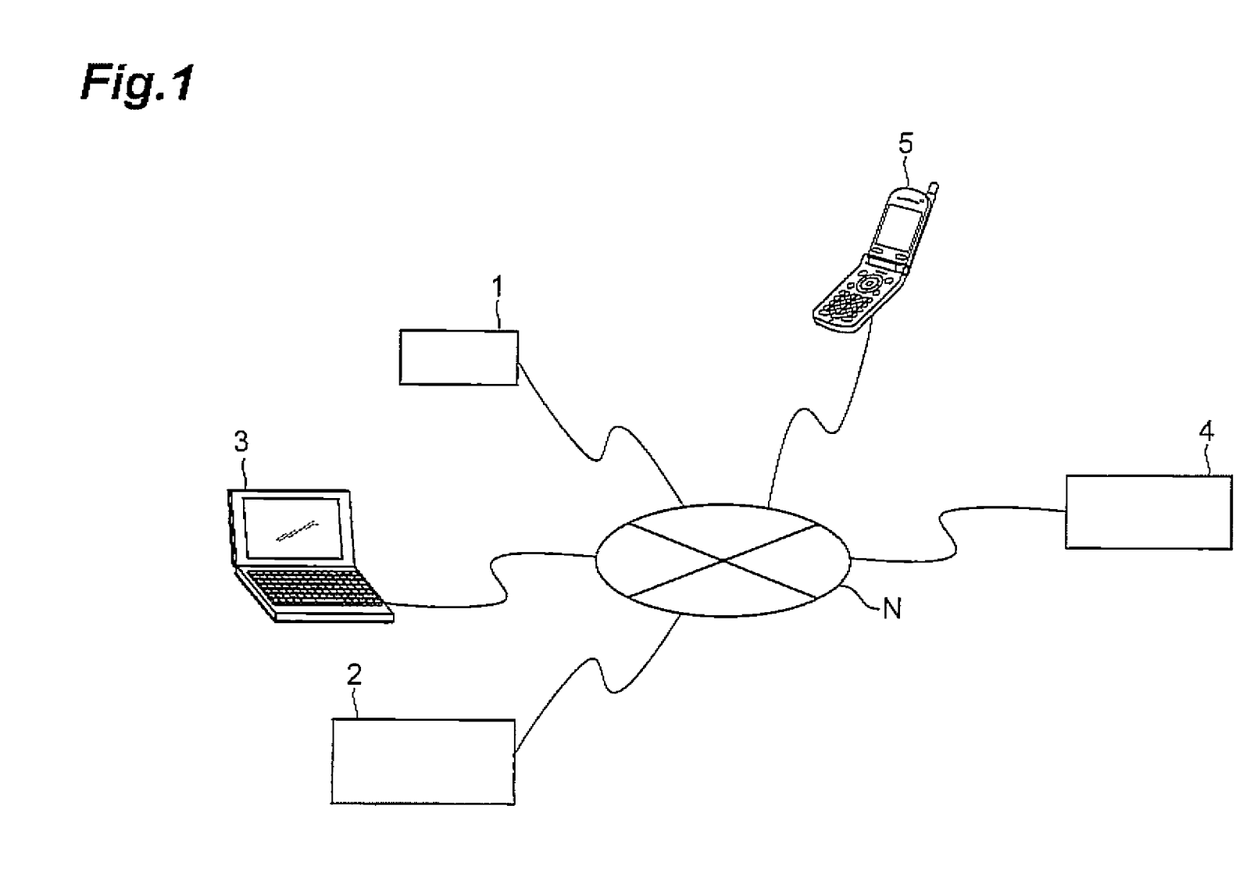
FIG. 1 is a schematic diagram of the configuration of an information providing system related to an embodiment of the invention.

FIG. 1 is a schematic diagram of the configuration of an information providing system related to an embodiment of the invention.

As shown in FIG. 1, the information providing system related to the present embodiment includes a navigation device 1 and an information management device 2. The navigation device 1 functions as an information providing device which is mounted on a vehicle and provides a driver or fellow passenger of the vehicle with destination information. As the navigation device 1, for example, a navigation device which recognizes a vehicle position using a GPS (Global Positioning System) and performs traveling assistance or routing assistance for the destination of the vehicle using map data is used. Additionally, the navigation device 1 includes a monitor or luminescent display unit which displays images, characters, or the like, and a speaker which emits a voice or the like, as an information providing means.

The navigation device 1 includes an information providing unit which provides information on a potential destination in accordance with the performance of electronic payment at the destination after traveling assistance to the destination by a vehicle-mounted device. For example, the navigation device 1 performs traveling assistance to a destination through a vehicle-mounted device of the vehicle being driven or other vehicles, and thereafter, acquires electronic payment information when electronic payment has been performed at the destination after the elapse of a predetermined time, and provides information on a potential destination according to the electronic payment information.

At this time, it is preferable that information on a destination at which electronic payment has been performed with a higher frequency be preferentially provided as the potential destination. For example, when the frequency at which electronic payment has been performed at a destination after routing assistance by a vehicle-mounted device is higher, information thereon is preferentially provided as a potential destination shown when carrying out a destination search.

The information management device 2 is a device which gathers, records and distributes information on a destination to be distributed to the navigation device 1, and is installed in an information management center or the like. The information management device 2 is configured so as to be capable of performing the communication of information with the navigation device 1, for example, is configured so as to be capable of performing the communication of information through a communication network N, such as the Internet. As the information management device 2, for example, an electronic control unit based mainly on a computer including a CPU, a ROM, and a RAM, and provided with recording means, such as a hard disk, is used.

The information management device 2 acquires site information on a site browsed by a personal computer (PC) 3 through the communication network N, and records the site information. For example, the browsing history information of a site on the Internet is acquired, and the browsing history information is recorded. The printing history of coupons of a store 4 or the like is also included in this browsing history information. Additionally, the information management device 2 preferably calculates and records the browsing frequency (for example, browsing frequency within a predetermined time) of each destination based on site information.

Additionally, the information management device 2 functions as an electronic payment information acquisition unit which acquires information on an electronic payment which has been performed at the store 4, i.e., electronic payment information, through the communication network N. This electronic payment information is acquired as, for example, the electronic payment history information, or the history information regarding the use of coupons. Also, the information management device 2 records the electronic payment frequency (for example, the frequency of electronic payments within a predetermined time) of a store along with store information for identifying the store. Additionally, the acquisition of electronic payment information and the recording of electronic payment frequency are executed even for other destinations, such as a facility, as well as the store.

The information management device 2 acquires and records the parking position information of a vehicle. For example, the switching of an accessory switch of a vehicle from ON to OFF is detected by a vehicle-mounted device, and the position of the vehicle at the time of the detection is acquired as a parking position. The information management device 2 acquires and records the parking position information through the communication network N from a vehicle-mounted device, such as the navigation device 1.

The information management device 2 acquires and records the action history information of a vehicle driver. For example, the information management device 2 acquires the movement history information of a portable phone 5 using the position detection function of the portable phone 5, and acquires the action history information of a vehicle driver who carries the portable phone 5. By acquiring this action history information, it is possible to detect that a driver visited a destination, such as a store or a facility, from a vehicle, and the frequency of utilization of a store by the driver, can be calculated. It is preferable that the acquisition and recording of this action history information be also performed for the fellow passenger of a vehicle as well as the driver.

The information management device 2 calculates the footfall of a destination. The footfall becomes an index indicating the rate or frequency at which users have actually utilized the destination, and may be called the footfall degree. This footfall is calculated using at least electronic payment information. For example, footfall is calculated on the basis of the frequency at which the site is browsed on the Internet, electronic payment frequency, and passenger utilization frequency.

Next, the operation of the information providing device and information providing system related to the present embodiment will be described.

Figure 2:
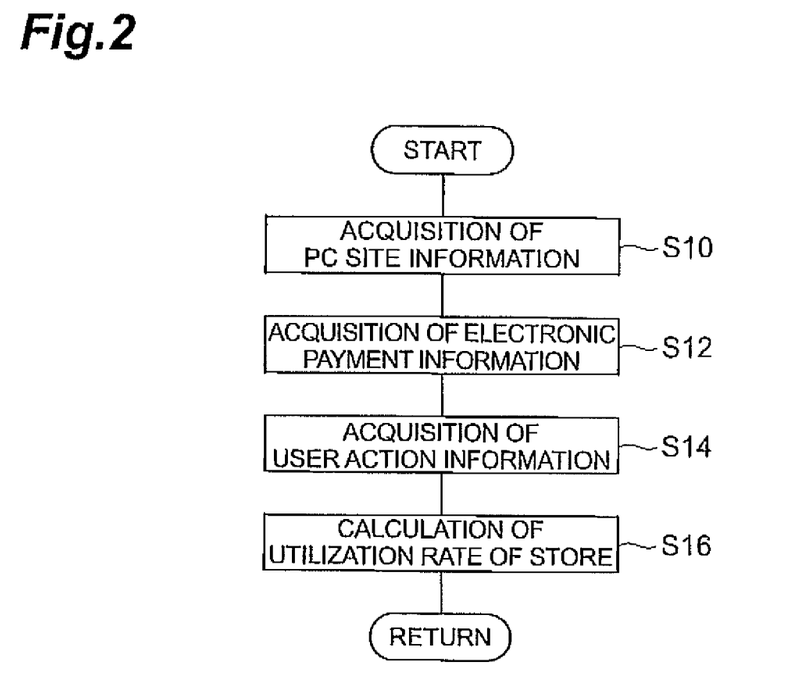
FIG. 2 is a flow chart showing information gathering processing in an information management device of the information providing system of FIG. 1.

FIG. 2 is a flow chart showing information gathering processing in the information management device 2. The information gathering processing in FIG. 2, for example, is repeatedly executed in a predetermined cycle by the information management device 2.

Acquisition processing of PC site information is performed as shown in Step S10 (hereinafter simply referred to as "S10"; the same holds true for steps after S10) of FIG. 2. The acquisition processing of PC site information is the processing of acquiring site information of a store, a facility, and the like, through the communication network N, such as the Internet. For example, the browsing history information of a site of the Internet is acquired, and the browsing history information is recorded.

Next, the processing proceeds to S12 where acquisition processing of electronic payment information is performed. The acquisition processing of electronic payment information is the processing of acquiring information on sales transactions, such as price payment, by an electronic means at a destination. For example, information on price payment by electronic money at the store 4, coupon use information at the store 4, or the like is acquired through the communication network N. Also, the information management device 2 records the electronic payment frequency (for example, the frequency of electronic payment within a predetermined time) of a store along with store information for identifying the store. Additionally, the acquisition of electronic payment information and the recording of electronic payment frequency are executed even for other destinations, such as a facility, as well as the store.

Next, the processing proceeds to S14 where acquisition processing of user action information is performed. The acquisition processing of user action information is the processing of acquiring the action information of a driver and a fellow passenger of a vehicle. For example, the parking position information of a vehicle is acquired, and the action information of a driver and a fellow passenger is acquired from the parking position through the movement history of a portable phone. It can be detected that the store 4, which becomes a destination, has actually been utilized on the basis of this user action information. Additionally, the position of a parking lot when the store 4 is utilized can be detected.

Next, the processing proceeds to S16 where utilization rate calculation processing of a store is performed. This utilization rate calculation processing is the processing of calculating the footfall of a destination. For example, the utilization rate calculation processing is calculated using at least the electronic payment information. For example, it is preferable that the footfall be calculated on the basis of the frequency at which the site is browsed on the Internet, electronic payment frequency, and passenger utilization frequency. If the processing of S16 is completed, the control processing of the information gathering processing is ended.

According to the information gathering processing in the information management device 2, the information regarding whether a user has actually utilized a destination of a vehicle, such as a store or a facility, can be gathered.

In addition, the processing of FIG. 2 of S10 to S16 may be executed after the sequence thereof is changed, and need not be necessarily performed as a series of control processing steps but may be executed as an individual task.

Figure 3:
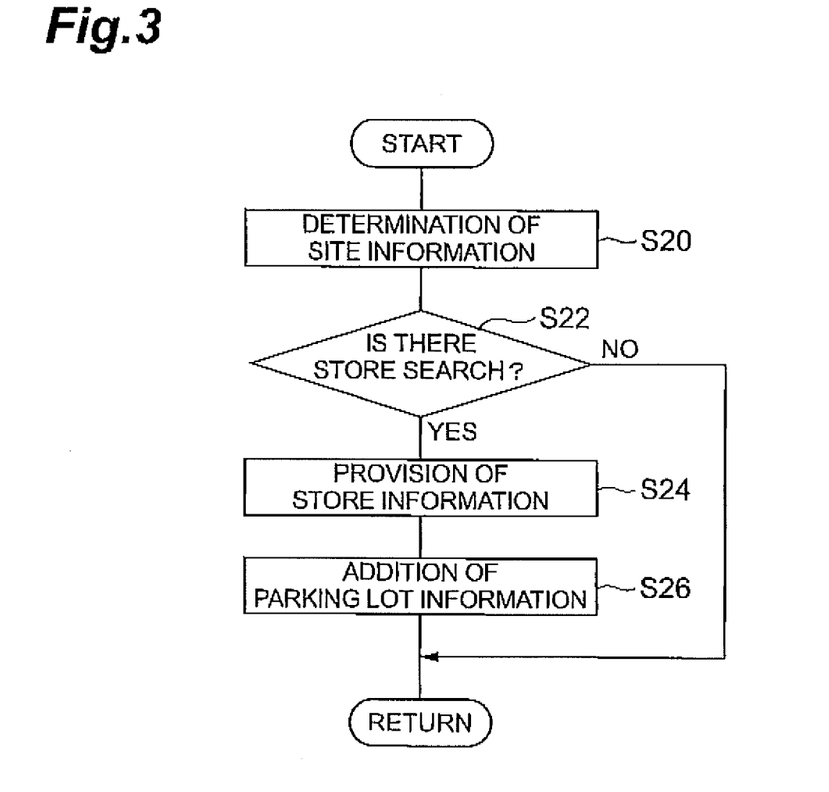
FIG. 3 is a flow chart showing information distribution processing hi the information management device of the information providing system of FIG. 1.

FIG. 3 is a flow chart showing the information distribution processing in the information management device 2. The information distribution processing in FIG. 3, for example, is repeatedly executed in a predetermined cycle by the information management device 2.

As shown in the S20 of FIG. 3, evaluation processing of the quality of site information is performed. This evaluation processing is the processing of evaluating the credibility of site information of the Internet. For example, the credibility of information on a website of the Internet is evaluated using the footfall calculated in S16 of FIG. 2.

Next, the processing proceeds to S22 where it is determined whether or not there has been any store search. This determination processing is the processing of determining whether or not there has been any inquiry in the form of a store search from the navigation device 1 mounted on a vehicle.

If there is no store search in S22, the series of control processing steps of the information distribution processing is ended. On the other hand, if there is a store search in S22, store information providing processing is performed (S24). The store information providing processing is the processing of providing the footfall of a store according to search conditions. The search conditions include a zone where the navigation device 1 is located, the type of store, and the like. Additionally, it is also preferable to provide store information to be used as alternative options. A proven store can be introduced through this store information providing processing. Additionally, at this time, the information in which the contents of a website are ranked according to the footfall may be provided. Moreover, it is preferable to register the website of a store as a well-rated site on the basis of the footfall of the store.

Next, the processing proceeds to S26 where additional processing of parking lot information is performed. This additional processing of parking lot information is the processing of performing addition of parking lot information to information on a store. For example, if there is any transmission of parking lot information on a store from the navigation device 1, the parking lot information is determined statistically and is included in store information as an evaluation item or additional information. If the processing of S26 is completed, the series of control processing steps of the information distribution processing is ended.

According to such information distribution processing, the store information according to an actual utilization situation can be provided.

Figure 4:
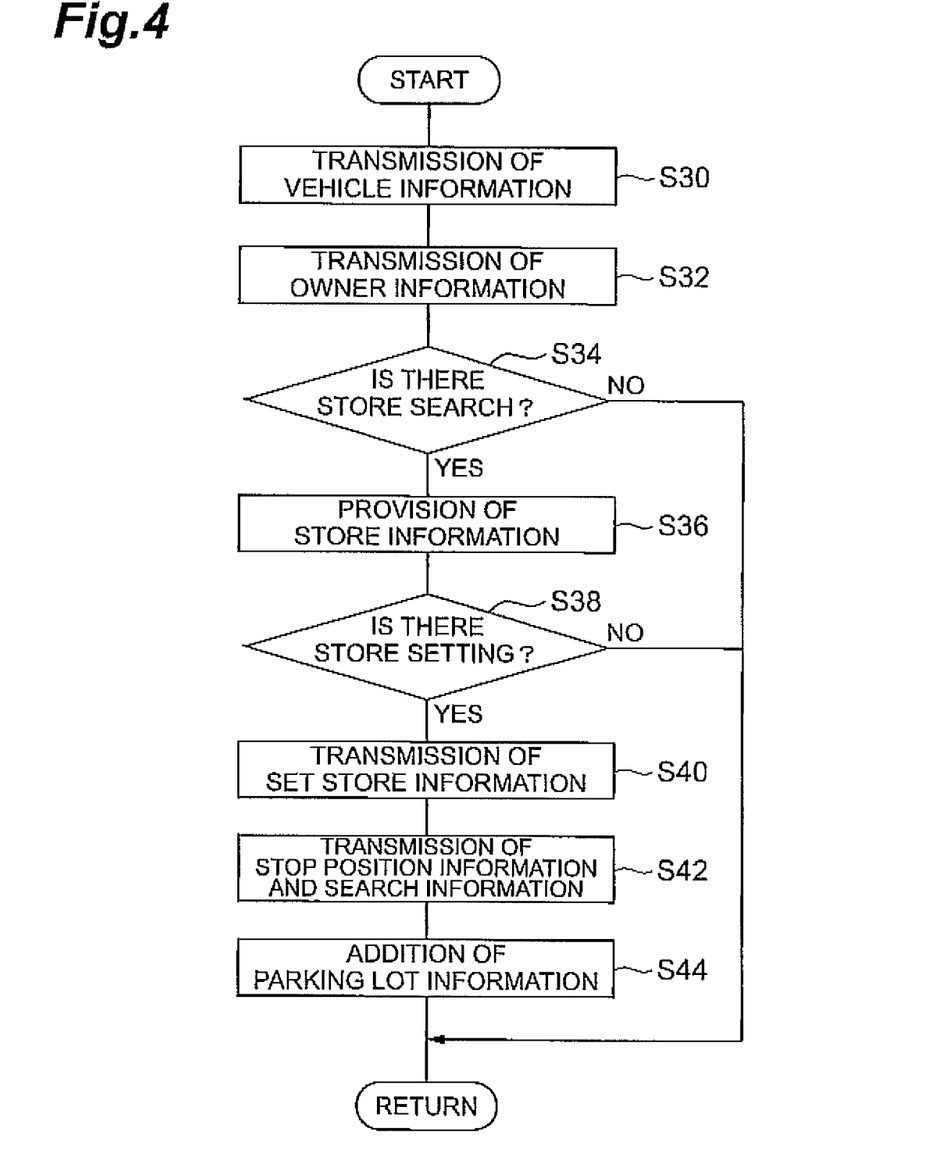
FIG. 4 is a flow chart showing the operation of a navigation device of the information providing system of FIG. 1.

FIG. 4 is a flow chart showing the operation of the navigation device 1. The control processing in FIG. 4 is repeatedly executed in a predetermined cycle by the navigation device 1.

As shown in S30 of FIG. 4, transmission processing of vehicle information is performed. The transmission processing of vehicle information is the processing of transmitting information which identifies a vehicle. For example, ID information of a vehicle or a driver is transmitted to the information management device 2 through the communication network N from the navigation device 1. Additionally, it is preferable to transmit information on the number of passengers of a vehicle as the vehicle information. The information on the number of passengers may be detected on the basis of, for example, the number of seat belts used. Additionally, the position information of a vehicle is transmitted as the vehicle information.

Next, the processing proceeds to S32 where transmission processing of owner information is performed. The transmission processing of owner information is the processing of transmitting information on the owner of a portable phone to the information management device 2 from the navigation device 1 when the cooperation function of the portable phone has been started. For example, the transmission processing is the processing of transmitting the action information of an individual to the information management device 2 though a portable phone of a driver or fellow passenger of a vehicle.

Next, the processing proceeds to S34 where it is determined whether or not there has been any store search. If no store search has been performed in the navigation device 1, the series of control processing steps is ended. On the other hand, if a store search has been performed, store information providing processing is performed (S36).

The store information providing processing is the processing of providing information on a store which becomes a potential destination. In this processing, the provision of store information is performed according to search conditions. At this time, if electronic payment has been performed at a store after traveling assistance to the store by a vehicle-mounted device, information on the store is preferentially provided.

For example, if the type of store is set as a search condition, stores which are in the vicinity of the navigation device 1 among such types of stores are selected as potential stores, and a store where electronic payment has been performed among the selected potential stores is displayed in advance on a monitor. Additionally, the store where electronic payment has been performed among the selected potential stores may be displayed on a monitor as a recommended store.

For example, if the keyword of the name of a store is set as a search condition, stores which are in the vicinity of the navigation device 1 among stores related to the keyword are selected as potential stores, and a store where electronic payment has been performed among the selected potential stores is first displayed on a monitor. Additionally, the store where electronic payment has been performed among the selected potential stores may be displayed on a monitor as a recommended store.

At this time, it is preferable that information on a store at which electronic payment has been performed with a higher frequency be preferentially provided as the potential store. At this time, it is preferable that a store at which electronic payment has been performed with a higher frequency within a predetermined period be first displayed on a monitor as the potential store. Otherwise, it is preferable that a store at which electronic payment has been performed with a higher frequency within a predetermined period be provided through information as a store with a higher degree of recommendation.

Additionally, at this time, an alternative proposal may be given as a potential store. For example, when a store is intended to be selected, a display or presentation may be formed such as "a person who wanted to visit this store changed to that store".

Additionally, when a store search is performed, it is preferable to select a potential store not on the basis of the distance from the present location but on the ease of arriving at a store. For example, a potential store may be selected on the basis of a route, a road, and the distance to a parking lot. Additionally, it is preferable to provide information in accordance with the constituent members of a group or its member.

Next, the processing proceeds to S38 where it is determined whether or not store setting has been performed. If a store is not set as a destination among potential stores in S38, the series of control processing steps is ended. On the other hand, if a store is set as a destination among potential stores in S38, transmission processing of the set store information is performed (S40). For example, the name of a store set as a destination or position information, such as latitude and longitude, is transmitted to the information management device 2 from the navigation device 1. Here, the navigation device 1 executes routing assistance to a store which is a destination by setting the destination.

Next, the processing proceeds to S42, and if a vehicle stops, stop position information of the vehicle is transmitted to the information management device 2 from the navigation device 1. For example, if a vehicle has stopped during movement to a destination, the stop position thereof is transmitted to the information management device 2. Whether or not a vehicle has stopped may be determined on the basis of whether or not an accessory switch of the vehicle is turned off. Additionally, a search word or search result at the time of store search is transmitted to the information management device 2.

Next, the processing proceeds to S44 where transmission processing of parking lot information is performed. For example, if it is determined that the accessory switch of the vehicle is turned off and the vehicle is parked, the position of the vehicle is transmitted to the information management device 2 as a parking lot position.

Additionally, if a vehicle has been parked, action history information of a user can be acquired by starting a cooperation function with a portable phone. For example, action history information of the driver and fellow passengers is acquired on the basis of signals transmitted from the portable phones of the driver and fellow passengers. Additionally, if a user goes into a store and performs electronic payment, a portable phone unique number is transmitted to the information management device 2 at the time of payment. Additionally, a store visiting history is gathered on the basis of use information regarding electronic money or coupons, and store visiting information is transmitted to the information management device 2 from a store. If the processing of S44 is completed, the series of control processing steps is ended.

According to the control processing of the navigation device 1, by providing information on a potential store in accordance with the performance of electronic payment at a destination after traveling assistance to a store by a vehicle-mounted device, a potential store can be selected on the basis of information on a store for which traveling assistance has actually been provided and which has been utilized, and information on the potential store can be provided. For this reason, information on a suitable potential store according to the actual utilization situation of a user can be provided.

Additionally, by preferentially providing information on a store at which electronic payment has been performed with a higher frequency as the potential store, information on a store for which traveling assistance has actually been provided and which has been utilized can be preferentially provided as the potential store. For this reason, information on a potential store can be suitably provided according to the utilization situation of a user.

In addition, although the case where a store is searched for and set as a destination has been described, the destination may be another destination, such as a facility.

As described above, according to the information providing device and information providing system related to the present embodiment, by providing information on a potential destination in accordance with the performance of electronic payment at a destination after traveling assistance to the destination by a vehicle-mounted device, a potential destination can be selected on the basis of information on a destination for which traveling assistance has actually been provided and which has been utilized, and information on the potential destination can be provided. For this reason, information on a suitable potential destination according to the actual utilization situation of a user can be provided. Additionally, information on a potential destination which is easy to travel to with a vehicle can be accurately provided by providing information on the basis of past results performed by a vehicle.

Additionally, in the information providing device and information providing system related to the present embodiment, by preferentially providing information on a destination at which electronic payment has been performed with a higher frequency as a potential destination, information on a destination for which traveling assistance has actually been provided and which has been utilized can be preferentially provided as a potential destination. For this reason, information on a potential destination can be suitably provided according to the utilization situation of a user.

Figure 5:
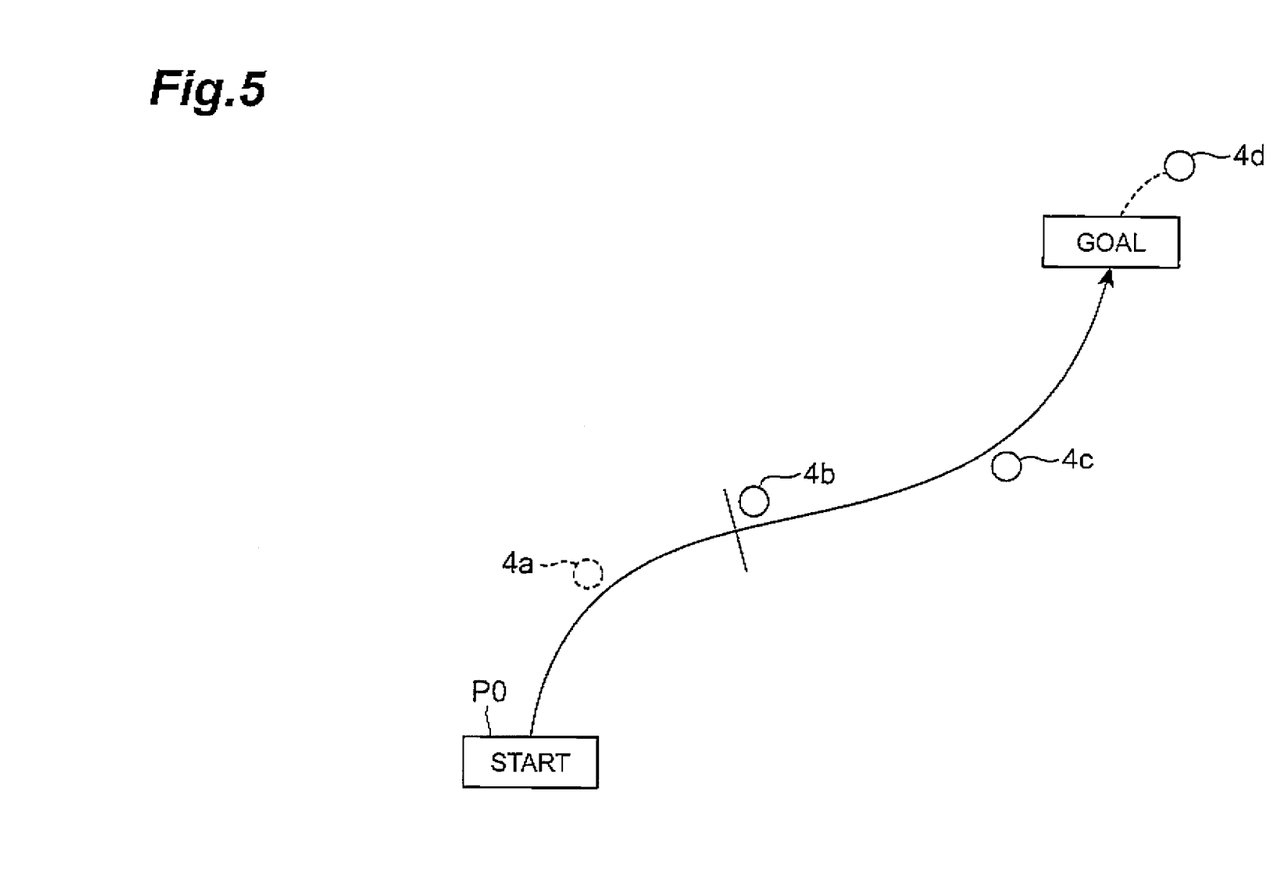
FIG. 5 is an explanatory view of potential store selection in the navigation device of the information providing system of FIG. 1.

Additionally, in the information providing device and information providing system related to the present embodiment, by providing information on a potential destination not on the basis of the distance from its present location but on ease of arrival when destination information is provided, information on a potential destination which is convenient for a user can be provided. For example, as shown in FIG. 5, when a store is searched for at the current position P0, potential stores are displayed according to their merit in regard to access by a vehicle if there are stores 4a to 4d in the vicinity of the position. In this case, even if a store 4a is near to the current position P0, when access thereto is impossible due to separating zones, such as a river, the store is not displayed as a potential store. Because access can be gained to a store 4b by entering the store from an intersection, the store is displayed as a potential store. Since a store 4c is along a road and has a parking lot, the store is displayed as a potential store. Since a store 4d has a parking lot within walking distance, the store is displayed as a potential store.

Additionally, by using the information providing device and information providing system related to the present embodiment, an advertising site company or the like can be provided with information on user actions or purchases or popularity determination information of a store for profit.

Additionally, the payment history information of a user can be received from an electronic money operating company by providing information regarding the traffic including the information gathering and action of a user to the electronic money operating company.

Industrial Applicability

According to the invention, by providing information on a potential destination in accordance with the performance of electronic payment at a destination after traveling assistance to the destination by a vehicle-mounted device, suitable destination information can be provided according to the utilization situation of a user.

Reference Signs List
   1: NAVIGATION DEVICE
   2: INFORMATION MANAGEMENT DEVICE
   3: PERSONAL COMPUTER
   4: STORE
   5: PORTABLE PHONE
   N: COMMUNICATION NETWORK

The invention claimed is:

1. An information providing system which provides information on potential destinations in a vehicle, the information providing system comprising:
   an electronic payment information acquisition unit which acquires information on electronic payment performed at a destination after traveling assistance to the destination by a vehicle-mounted device; and
   an information providing unit which provides information on a potential destination in accordance with the electronic payment information acquired by the electronic payment information acquisition unit, wherein the information providing unit preferentially provides information on a designation at which electronic payment has been performed with a higher frequency as the potential destination.

\* \* \* \* \*